US 6,941,568 B2

(12) United States Patent
Huang

(10) Patent No.: US 6,941,568 B2
(45) Date of Patent: Sep. 6, 2005

(54) OPTICAL DISK DRIVE ASSEMBLY

(75) Inventor: Hui-Chu Huang, Taipei (TW)

(73) Assignee: Lite-On It Corporation, Taipei (TW)

(*) Notice: Subject to any disclaimer, the term of this patent is extended or adjusted under 35 U.S.C. 154(b) by 330 days.

(21) Appl. No.: 10/430,958

(22) Filed: May 5, 2003

(65) Prior Publication Data

US 2004/0062172 A1 Apr. 1, 2004

(30) Foreign Application Priority Data

Sep. 27, 2002 (TW) .................................... 91215362 U

(51) Int. Cl.⁷ .......................................... G11B 17/03
(52) U.S. Cl. ..................................... 720/639; 720/655
(58) Field of Search ................... 720/610, 639, 720/655

(56) References Cited

U.S. PATENT DOCUMENTS 6,775,836 B2 * 8/2004 Joung ........................ 720/639
6,826,764 B2 * 11/2004 Fujisawa .................... 720/610

* cited by examiner

Primary Examiner—George Letscher
(74) Attorney, Agent, or Firm—Thomas, Kayden, Horstemeyer & Risley

(57) ABSTRACT

An optical disk drive assembly. A top housing, cover, tab, solenoid switch base, solenoid switch, hook, and torsion spring work to enable securing and opening of the cover, rotatably connected to the top housing with a front edge. The tab protrudes from the front edge of the cover in the middle, and defines an opening. The solenoid switch base is disposed on the top housing and comprises a torsion spring and a spring support and defines a shaft opening. The solenoid switch is inserted at the solenoid switch base and comprises a pivot and a tension spring disposed on the pivot. The hook comprises a hook shaft, and the hook pivots on the solenoid switch with the hook shaft accommodated in the shaft opening. The torsion spring is disposed at the spring support of the solenoid switch base to open the cover.

4 Claims, 6 Drawing Sheets

OPTICAL DISK DRIVE ASSEMBLY

BACKGROUND OF THE INVENTION

1. Field of the Invention

The invention relates to an optical disk drive assembly, and more particularly to an external optical disk drive assembly with an apparatus including elements such as a spring and a solenoid switch to open a cover of the optical disk drive assembly.

2. Description of the Related Art

An optical disk drive assembly in a separate housing, referred to as an external optical disk drive assembly, is connected to a computer system via a signal cord to transmit information to the computer system or via an earphone cord to transmit audio data.

Conventional external disk drive assemblies comprise horizontal sliding tray (FIG. 1) and hinged-lid types. The sliding tray type has a linear opening on the panel acting as a disk entrance. Disadvantages include increased possibility of interference from foreign objects and increased complexity of manufacture and operation, also resulting in difficult repair and adjustment.

A conventional hinged-lid optical disk drive assembly is shown in FIG. 2. FIG. 3 is a perspective diagram of a cover of a conventional hinged-lid CD-ROM drive. As shown in FIGS. 2 and 3, the assembly includes a cover 100 and a housing 200. The cover 100 is provided with an opening 101 at the front central edge, and a flexible tongue 102 disposed on a side of the front central edge. The cover 100 is rotatably connected on the housing 200 by a cover shaft 103. The cover shaft 103 is disposed at the back edge of the cover 100 to save space and improve appearance. The cover 100 is closed and closed by a hook 300 through the opening 101. When the cover 100 is firmly closed, a force F is applied on the flexible tongue 102 on the front edge of the cover 100 by a torsion spring 400. As shown in FIG. 3, the flexible tongue 102 is not aligned with the opening 101 in the middle. Due to the spring force F on the torsion spring action point 401 on the front edge of the cover 100, the connection between the cover 100 and the housing 200 is slightly separated as a gap and results in a displacement D on the edge of the cover. Thus the cover 100 is deformed due to torque from the misalignment between the opening 101 and the spring force direction F (or flexible tongue 102), as shown in FIG. 3. Especially during shipping, high environmental temperatures can accelerate deformation. The product may be damaged before reaching the market.

Thus, there is a need to modify conventional external CD-ROM so as to address the problem of deformed cover.

SUMMARY OF THE INVENTION

The present invention provides an apparatus to easily open a cover of an external optical disk drive assembly.

Accordingly, the present invention provides an optical disk drive assembly whose lid, even at high temperatures, does not deform and remains firmly closed on the housing without a gap due to deformation.

An optical disk drive assembly comprises a top housing, a cover, a tab, a solenoid switch base, a solenoid switch, a hook, and a torsion spring. The cover is rotatably connected to the top housing and has a front edge. The tab protrudes from the front edge of the cover at the middle, and defines an opening. The solenoid switch base is disposed on the top housing, comprises a torsion spring and a spring support, and defines a shaft opening. The solenoid switch is inserted at the solenoid switch base and comprises a pivot and a tension spring disposed on the pivot. The hook comprises a hook shaft, and the hook pivots on the solenoid switch with the hook shaft accommodated in the shaft opening. The torsion spring is disposed at the spring support of the solenoid switch base by pushing the tab to elastically open the cover.

DESCRIPTION OF THE DRAWINGS

For a better understanding of the present invention, reference is made to a detailed description to be read in conjunction with the accompanying drawings, in which.

DETAILED DESCRIPTION OF THE INVENTION

Figure 1:
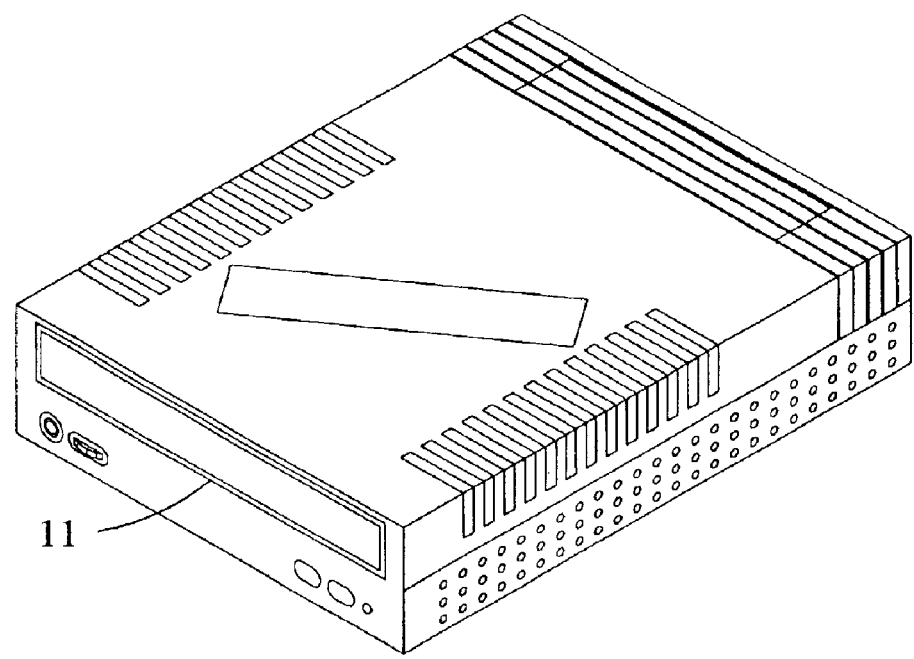
FIG. 1 (Prior Art) is a perspective diagram of a conventional sliding tray CD-ROM drive.
Figure 2:
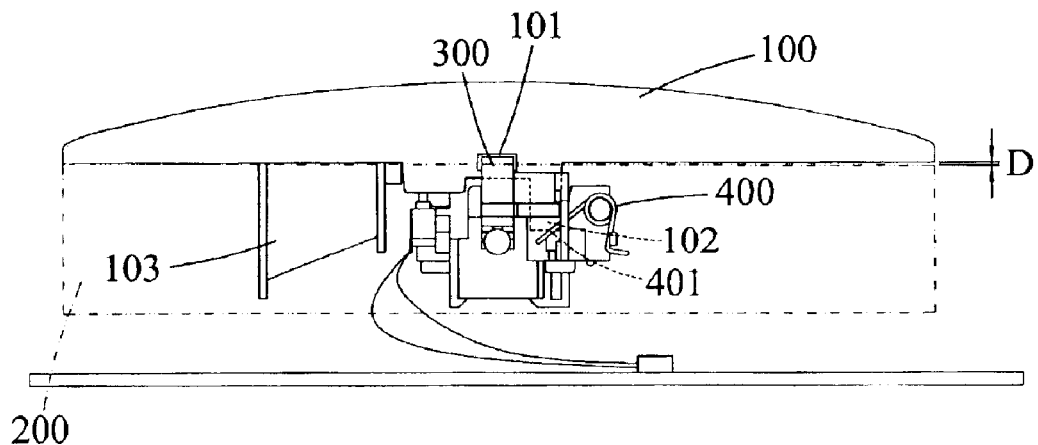
FIG. 2 (Prior Art) is a front perspective diagram of a conventional hinged-lid CD-ROM drive.
Figure 3:
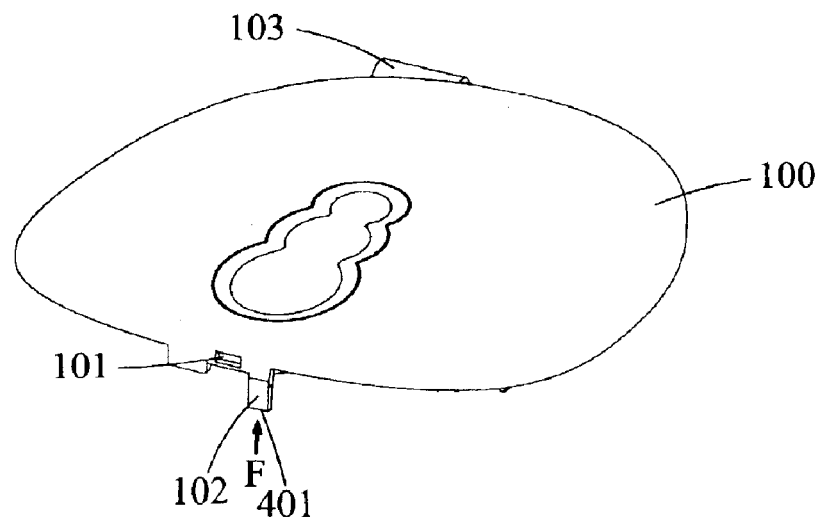
FIG. 3 (Prior Art) is a perspective diagram of a cover of a conventional hinged-lid CD-ROM drive.
Figure 4:
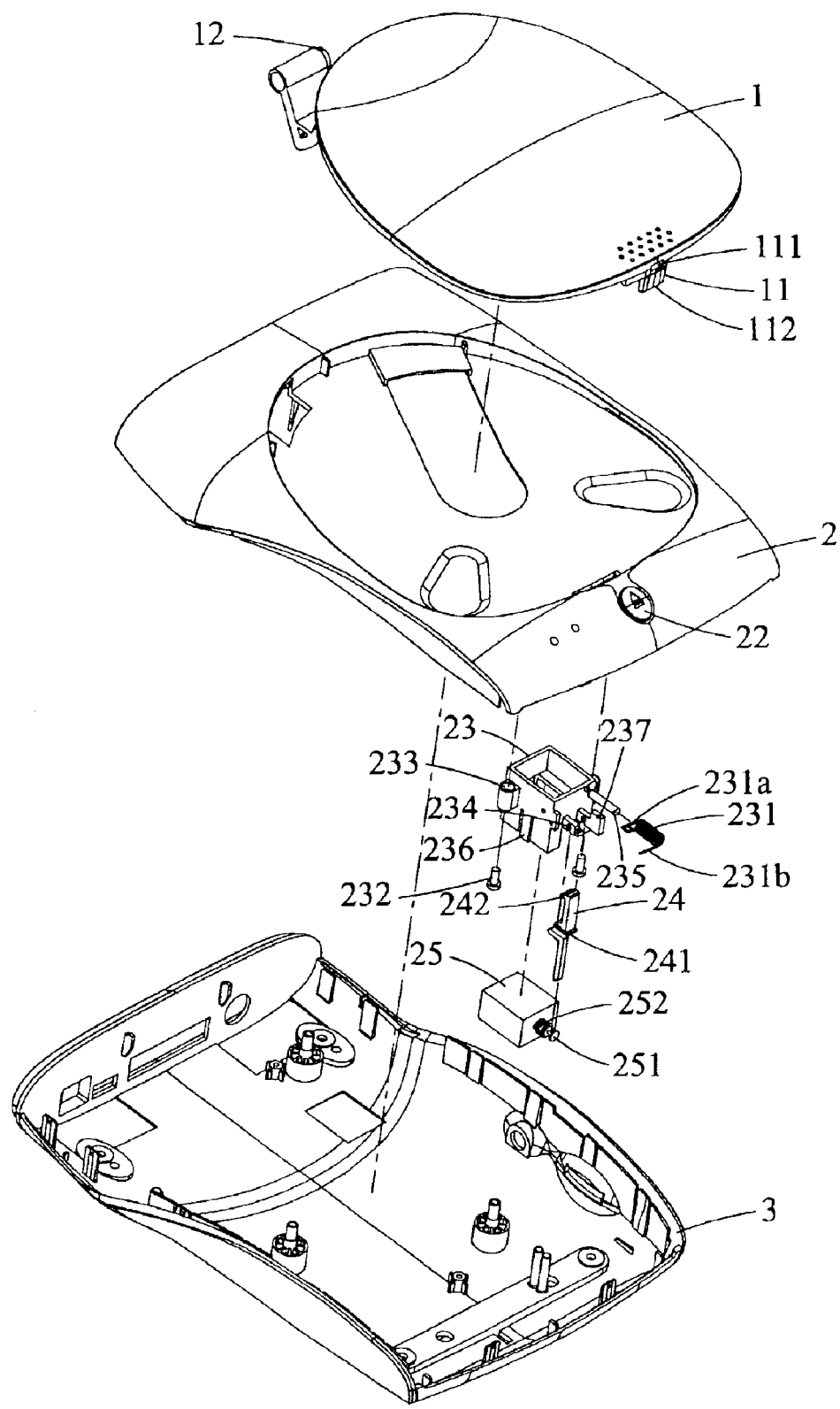
FIG. 4 is an exploded perspective diagram of an apparatus to open a cover of a CD-ROM drive in accordance with the present invention.

FIG. 4 is an exploded perspective diagram of an apparatus to open a cover of a CD-ROM drive in accordance with the present invention.

In FIG. 4, the CD-ROM mainly includes a cover 1, a top housing 2, and a bottom housing 3. The locking and release apparatus of the present invention is disposed between the top housing 2 and the bottom housing 3.

The cover 1 has a front edge and a back edge. A tab 11 protrudes from the front edge of the cover 1 right at the center, and defines an opening 111 on the tab 11. The tab 11 with a tab edge 112 is part of the locking apparatus of the cover 1. The tab edge 112 also receives a spring force, and when the spring force acts on the tab edge 112, the tab 11 of the cover 1 is ejected from the locking apparatus. A cover shaft 12 is located at the back edge of the cover 1 to rotatably connect the cover 1 with the top housing 2. The top housing 2 has a top and a bottom. As shown in FIG. 4, the cover 1 is disposed on the top of the top housing 2.

Figure 5:
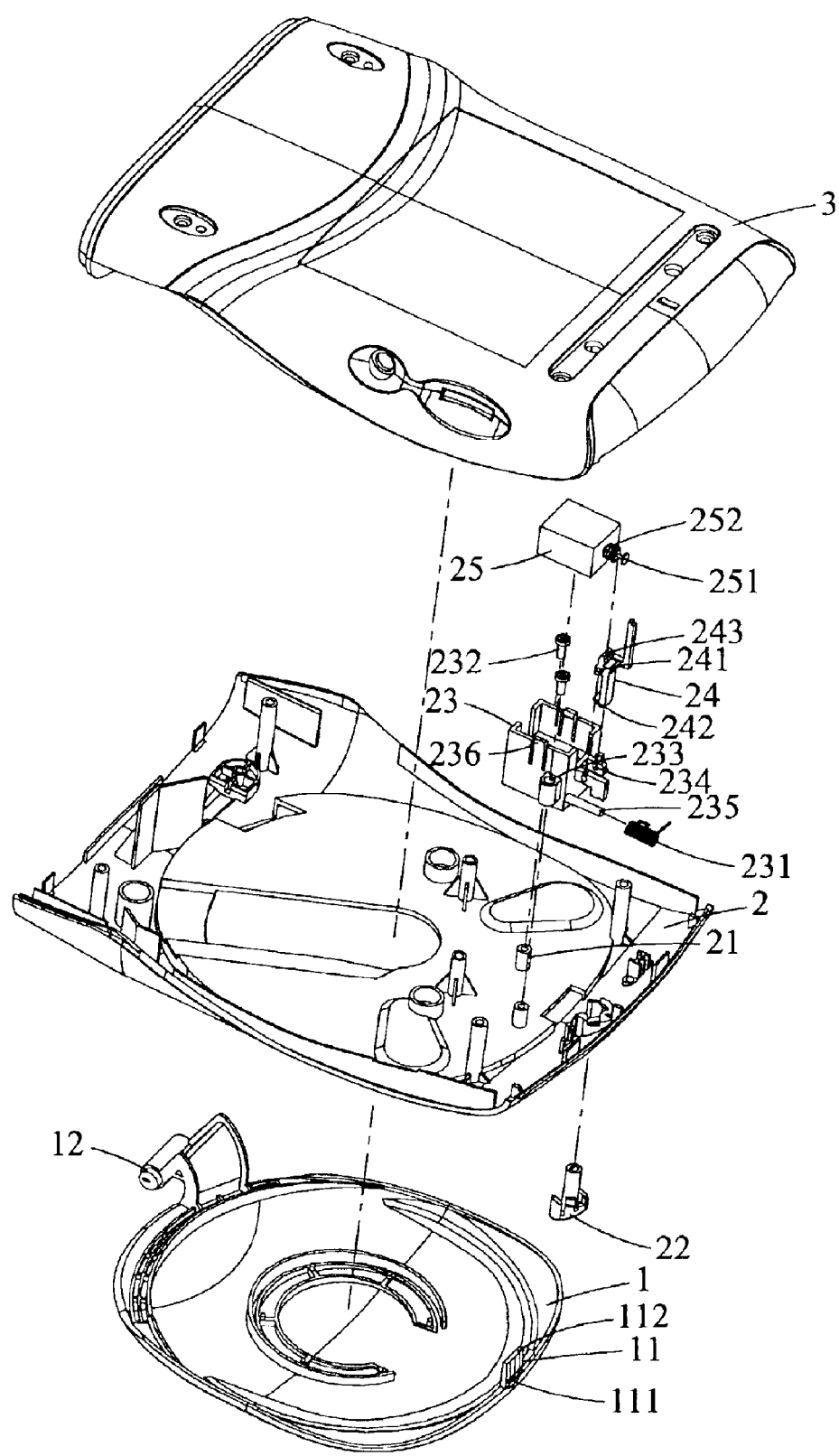
FIG. 5 is an exploded perspective diagram of the apparatus to open the cover of the CD-ROM drive in accordance with the present invention, in a view opposite to FIG. 4.

FIG. 5 is an opposite view of FIG. 4, such that, in this case, the bottom of the top housing 2 faces upward. In FIG. 5, a solenoid switch fixing post 21 is disposed on the bottom of the top housing 2 to firmly connect a solenoid switch base 23 thereon. Two sides of the solenoid switch base 23 are provided with screw openings 233. The solenoid switch base 23 is further fixed on the top housing 2 by advancing screws 232 through the solenoid switch fixing post 21. An engaging arm 236 is disposed on both walls of solenoid switch base 23. A solenoid switch 25 is inserted in the engaging arms 236. The above mentioned elements are formed as a release mechanism for the present invention.

The solenoid switch 25 comprises a pivot 251. When the solenoid switch 25 is electrically connected, the pivot 251 is retracted to an inner position due to magnetic force. A tension spring 252 is disposed on the pivot 251. When the solenoid switch 25 is idle, the tension of the spring pushes the pivot 251 to its position farthest from the solenoid switch 25. A hook 24 comprises a hook shaft 241 and a pivot groove 243 with a hook point 242 on the top end of the hook 24, as shown in FIG. 5. The pivot groove 243 receives the pivot 251, that is, the pivot groove 243 is connected to a location between the pivot 251 of the solenoid switch 25 and the tension spring 252. The hook shaft 241 is disposed within a shaft opening 234 of the solenoid switch base 23.

Figure 6:
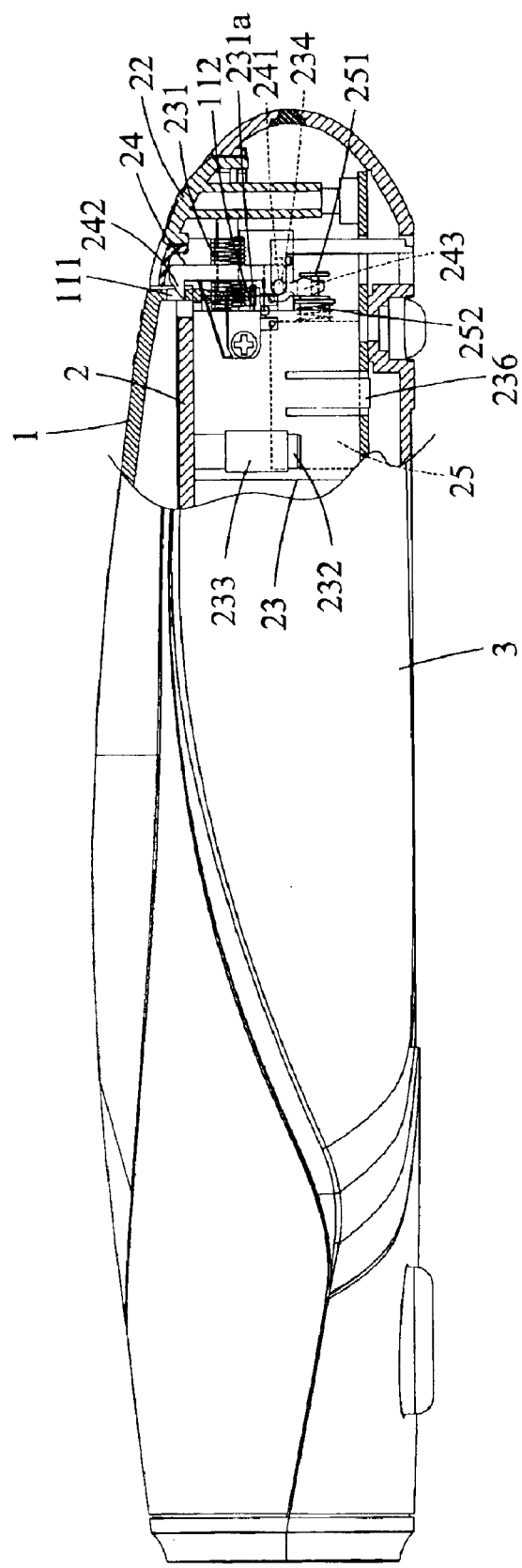
FIG. 6 is a side cross-section of the CD-ROM drive in accordance with the present invention when the cover is closed.
Figure 7:
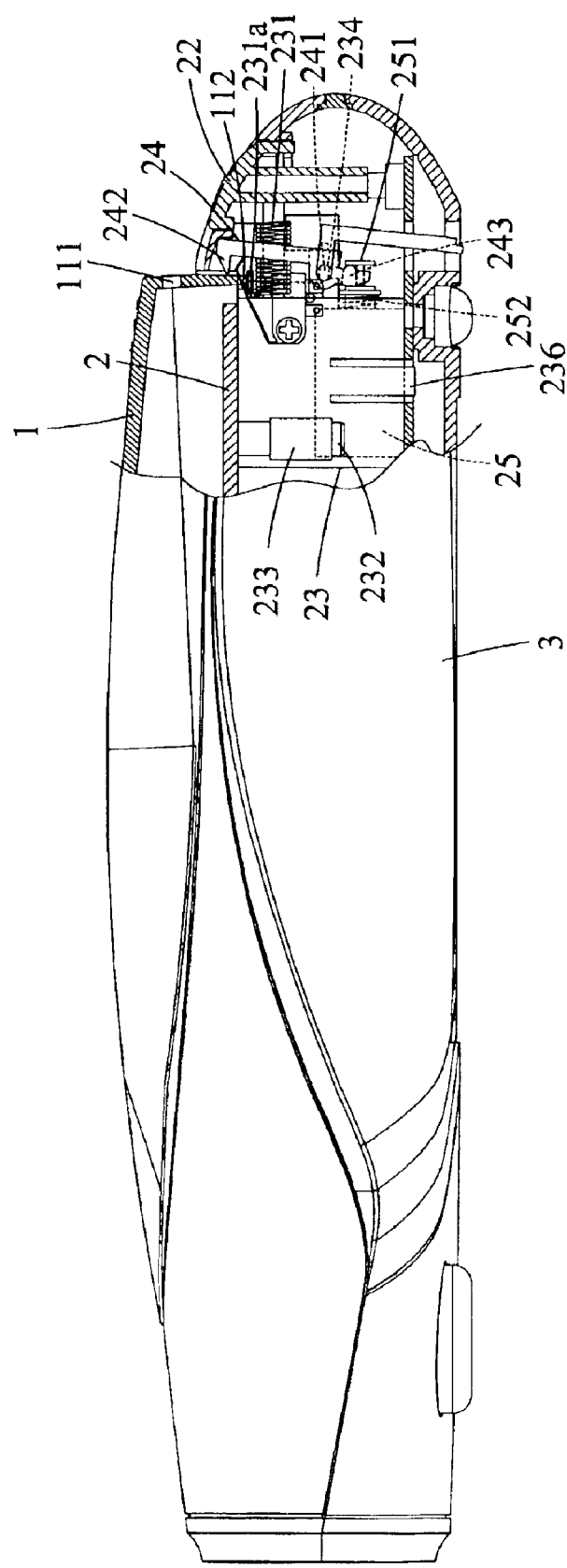
FIG. 7 is a side cross-section of the CD-ROM drive in accordance with the present invention when the cover is open.

FIG. 6 is a side cross-section of the CD-ROM drive in accordance with the present invention when the cover is closed. FIG. 7 is a side cross-section of the CD-ROM drive in accordance with the present invention when the cover is opened.

As shown in FIGS. 6 and 7, when the solenoid switch 25 is operated, the pivot 251 moves inward, in a direction towards the solenoid switch 25, while also driving the pivot groove 243 inward. With hook shaft 241 as a central axis, the hook point 242 moves outward to withdraw the hook 24 from the opening 111 of the cover 1 to completely release the cover 1.

A spring support 235 is disposed on the solenoid switch base 23, with a torsion spring 231 on the spring support 235. The torsion spring 231 has a first end 231a and a second end 231b. The second end 231b is placed on a spring holding groove 237 (shown in FIG. 4) of the solenoid switch base 23. To release the hook 24 and open the cover 1, the first end 231a of the torsion spring 231 applies a force on the tab edge 112 to separate the hook point 242 from the opening 111 on the cover 1 so that the cover 1 is completely open.

Due to the action point of cover 1 by the torsion spring 231, the tab edge 112 is disposed on the front and central edge of the cover 1. When the cover is firmly closed, the advantage of the present invention is that no torque occurs due to misalignment between the tab and the spring action point, such that the cover of the CD-ROM in accordance with the present invention does not deform therefrom. Both the quality and the appearance of the CD-ROM are improved and the problem of deformation is minimized.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive assembly, comprising:

a top housing;

a cover, rotatably connected to the top housing, having a front edge;

a tab, protruding from the front edge of the cover at the middle, and defining an opening;

a solenoid switch base, disposed on the top housing, comprising a torsion spring and a spring support and defining a shaft opening;

a solenoid switch, inserted at the solenoid switch base, comprising a pivot and a tension spring disposed on the pivot;

a hook, comprising a hook shaft, the hook pivoting on the solenoid switch with the hook shaft accommodated in the shaft opening; and a torsion spring, disposed at the spring support of the solenoid switch base, pushing the tab to elastically open the cover.

2. The optical disk drive assembly of claim 1, wherein the bottom of the top housing comprising a solenoid switch base fixing post and screws, and defining screw openings on the solenoid switch base, thereby the solenoid switch base is fixed on the top housing by the screws via the screw openings.

3. The optical disk drive assembly of claim 1, wherein the solenoid switch base has two walls, each of which is provided with an engaging arm for receiving the solenoid switch.

4. The optical disk drive assembly of claim 1, wherein the hook has a hook point and a pivot groove, wherein the pivot of the solenoid switch is disposed in the pivot groove, and when the solenoid switch is operated, the hook point of the hook withdraws from the opening of the tab to open the cover.

* * * * *